Patented Apr. 11, 1950

2,503,820

UNITED STATES PATENT OFFICE 2,503,820

N'-ISOPROPOXYBENZOYL SULFANILAMIDE

Hans Gysin, Basel, Switzerland, assignor to J. R. Geigy A. G., Basel, Switzerland, a Swiss company No Drawing. Application March 29, 1948, Serial No. 17,795. In Switzerland April 3, 1947

1 Claim. (Cl. 260—397.7)

The present invention describes the manufacture of a new acylated sulphonamide, and of its salts.

$N_1$-(p-isopropoxy-benzoyl)-p-amino-benzene-sulfonamide, having the formula $NH_2$—$C_6H_4$—$SO_2$—NH—CO—$C_6H_4$—O—$CH(CH_3)_2$ and its salts have been unknown up till now.

It has now been found that this new acylated sulfonamide can be prepared by condensing a reactive, functional derivative of a benzene-sulfonic acid having the general formula $R_1$—$C_6H_4$—$SO_3H$    I wherein $R_1$ is a radical in the p-position which can be converted into the p-amino group, with p-isopropoxy-benzoic acid or with a reactive functional derivative thereof, and then converting the radical $R_1$ into a p-amino group. One of the two components taking part in the reaction must be present in the form of a functional derivative of ammonia (acid amide or acid amide derivative).

For example, the sulfonamide defined above may be prepared by reacting a p-substituted benzene sulfonamide of the general formula $R_1$—$C_6H_4$—$SO_2NH_2$ wherein $R_1$ is a radical which may be converted into a p-amino group by hydrolysis or reduction, with p-isopropoxy-benzoic acid or a reactive functional derivative thereof. The group $R_1$ is then converted into the amino group by hydrolysis or reduction.

A method of carrying out this process which gives particularly good results is the reacting at an elevated temperature of an acid halide, e. g., the acid chloride, of p-isopropoxy-benzoic acid with a p-acylamino-benzene sulfonamide or a p-nitro-benzene sulfonamide in the presence of an inert diluent, such as chlorobenzene and of a condensing agent such as copper powder. It is advantageous to use those acylamino-benzene-sulfonamides whose acyl group can be easily split off by hydrolysis, e. g., p-acetylamino- or p-carbomethoxyamino-benzene-sulfonamide.

A few variations of this method of preparation, which also fall within the scope of the invention, will now be given:

For example, the following p-acylamino-benzene sulfonamides may also be employed: p-formyl-, -propionyl-, -butyryl-, -isobutyryl-, -benzoylaminobenzene-sulfonamide, -carbethoxy-, -carbopropoxy-, -carboisopropoxy-, -carbobenzyloxy-aminobenzenesulfonamide and other p-acylaminobenzene-sulfonamides, whose acyl radicals can be split off by hydrolysis. Furthermore p:p'-disulfonamido-N:N'-diphenylurea:

$H_2N$—$SO_2$—$C_6H_4$—NH—CO—NH—$C_6H_4$—$SO_2NH_2$ can also be used as starting material, as can other p-aminobenzenesulfonamides acylated with carbamic acid derivatives. Instead of starting with p-nitrobenzene-sulfonamide, p-nitroso- or p-benzylamino-benzenesulfonamide and other p-substituted benzenesulfonamides which can be converted to p-amino-benzenesulfonamide by reduction may be used. Special mention may also be made of p-(benzeneazo)-benzenesulfonamide, p-(benzeneazoxy)-benzene-sulfonamide, p:p'-disulfonamido-azobenzene and p-(carbo-benzyloxy)-amino-benzenesulfonamide.

Besides copper powder, aluminium chloride, stannic chloride, ferric chloride and the like may be used as condensing agents. However, the presence of such a condensing agent is not absolutely essential.

A further possible variation consists in carrying out the condensation in the presence of an acid-binding agent, for example, an organic base like pyridine, quinoline, dimethylaniline, trimethylamine or an inorganic compound such as soda, potash or calcium carbonate. In place of the free, p-substituted benzenesulfonamides, their salts, e. g., the alkali salts, may also be used. For example, the sodium salt can be allowed to react, either in suspension in an inert organic solvent or dissolved in water.

Instead of using the acid halides, acylation may also be carried out using the anhydride of p-isopropoxy-benzoic acid. In addition the free carboxylic acid may be reacted with the p-substituted benzene sulfonamide in the presence of condensing agents, such as, e. g., phosphorus pentachloride or phosphorus pentoxide.

Suitable diluents are, for example, hydrocarbons, halogenated hydrocarbons, nitro compounds, ether and other inert solvents. Sometimes, however, an excess of the carboxylic acid derivative may be used as diluent, or a diluent may be dispensed with.

In special cases it may seem expedient to use another process. Thus, the acylated sulfonamide originally defined may be prepared by reacting a p-substituted benzenesulfonic acid halide of the general formula, $R_1$—$C_6H_4$—$SO_2$—Hal with a metal compound of the amide of p-isopropoxy-benzoic acid and subsequently converting the $R_1$ group into the amino group. This reaction is best carried out at an elevated temperature in an inert solvent.

A further process for the production of the new sulfonamide makes use of the hydrolysis of substituted amidines and imino ethers of p-isopropoxy-benzoic acids corresponding to the general formula

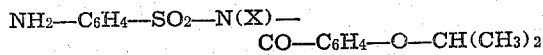

wherein $R_2$ denotes an alkoxy, aralkoxy, amino or substituted amino group, and $R_3$ denotes an amino group or a radical which can be converted into the amino group by hydrolysis or reduction.

Imino-ethers and amidines of this general formula are easily obtainable. For example, the nitrile of p-isopropoxy-benzoic acid yields on treatment with alcohols (preferably lower molecular) in the presence of anhydrous inorganic acids, e. g., hydrochloric acid, the corresponding salts of imino-ethers of the general formula

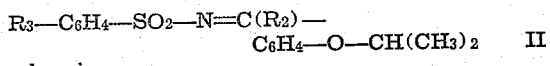

wherein $R_2$ denotes an alkoxy or aralkoxy group.

Analogous amidines of general Formula III, wherein $R_2$ denotes an amino or substituted amino group, e. g., an alkylamino, dialkylamino or phenylamino group are obtained from the above imno-ethers, by treatment with ammonia or amines, for example. However, it is also possible to produce amidines of this type which have non-substituted nitrogen atoms directly, e. g., by the reaction between sodium amide and p-isopropoxy-benzonitrile.

The amidines and imino-ethers of Formula II are obtained from the intermediate products of Formula III by reaction with a halide of the p-substituted benzene-sulfonic acid of Formula I, whereupon the radical $R_1$ may be converted to the amino group, if desired at this stage.

The hydrolysis of the compounds of Formula II gives the desired result when carried out by warming with acid and alkaline hydrolysing media (hydrochloric acid, sulphuric acid, phosphoric acid and the like). Dilute hydrochloric acid (1- to 2 normal) is usually sufficient to hydrolyse the amidines and imino-ethers with a free amino group ($R_3=NH_2$), whereas concentrated acids are frequently necessary when $R_3$ is a nitro or an acylamino group. In the latter case it is occasionally possible to hydrolyse the acylamino group to the amino group simultaneously with the hydrolysis of the amidine or iminoether group. However, where necessary, $R_3$ may be reduced or hydrolysed to give the amino group in a final step.

The p-isopropoxy-benzoic acid used as starting material is known, see, e. g., Grignard, Dupont, Locquin, Traité de chimie organique, vol. XI, p. 666.

The new acylated sulfonamide may be converted by methods known per se into salts with bases and basically reacting compounds, e. g., with caustic soda solution, sodium carbonate, sodium bicarbonate, calcium hydroxide, ammonia, magnesium hydroxide or organic bases such as dimethylamine, diethylamine, morpholine, ethylamine, ethanolamine, diethanolamine, ethylene diamine and the like. In some cases the salts, especially the alkali and alkaline earth salts, may be separated from the hydrolysis or reduction mixture directly. They may also be obtained by double decomposition of readily soluble salts of the acylated sulfonamide with salts of bases capable of forming difficulty soluble sulfonamide salts. These salts have the general formula

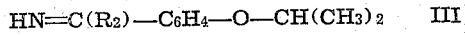

$$CO-C_6H_4-O-CH(CH_3)_2$$

wherein X denotes the normal equivalent of any desired cation, by which is meant that proportion of cation which can replace a proton ($H^+$), e. g., $Na^+$, $K^+$, $NH_4^+$, $Ca^{++}/2$, $Mg^{++}/2$, $(NH_3-CH_3)^+$
$(NH_2-CH_2-CH_2-NH_3)^+$
$(NH_3-CH_2-CH_2-NH_3)^{++}/2$ The new sulfonamide has manifold possibilities for technical application, e. g., as an intermediate in the production of textile assistants. For example, capillary active products suitable for use as washing, emulsifying or wetting agents are obtained on acylating the p-amino group with high molecular fatty acids.

It has also been found that the new sulfonamide has outstanding therapeutic properties. It combines low toxicity with high chemotherapeutic activity. As compared with corresponding p-amino-benzenesulfonamides acylated with methoxylated benzoic acid, it is more active and is particularly well tolerated by the body. Even with over-doses hardly any undesirable accompanying effects appear.

The $N_4$-acetyl derivative is well soluble in serum and in urine so that no deposits are formed in the liver, kidneys or urinary tract.

The new sulfonamide is therefore suitable for preparing medicaments for both internal and external use. It can be used as free sulfonamide or in the form of its salts. For example, the following salts are suitable for use: the sodium, potassium, lithium, magnesium or calcium salt, as well as salts with organic bases such as ethylamine, dimethylamine, diethylamine, morpholine, ethylene diamine, ethanolamine, diethanolamine, triethanolamine. The salts are soluble in water. The solutions react neutral or weakly alkaline (pH 7–9) and are very well suited for injection purposes.

The examples which follow serve further to illustrate the invention. Parts are always by weight and the temperatures are in degrees centigrade. By dilute acids and alkalis are meant approximately 2 N solutions.

*Example 1*

50 parts of p-isopropoxy-benzoyl chloride are refluxed, being stirred meanwhile, with 50 parts of p-nitrobenzenesulfonamide, 200 parts of dry chlorobenzene and 1 part of copper powder for a few hours. When no more hydrochloric acid is evolved the chlorobenzene is removed by steam distillation. The residue is taken up in dilute sodium carbonate solution, animal charcoal added, and the whole then filtered. On acidification with concentrated hydrochloric acid, $N_1$-(4-isopropoxy-benzoyl)-p-nitro-benzenesulfonamide is precipitated. After recrystallisation from dilute alcohol the product has a melting point of 172–173°.

Ferric chloride or aluminium chloride may be used as catalyst instead of copper powder. In certain cases one or other of the reactants may be used in excess to improve the yield. It is also possible to obtain the same product by condensation of free p-isopropoxy-benzoic acid or its sodium salt, for example, with p-nitro-benzenesulfonamide in the presence of a phosphorus pentahalide, e. g., phosphorus pentachloride, or by condensation of the free acid with p-nitrobenzenesulfonamide in the presence of phosphorus pentoxide.

80 parts of the crude nitro compound are reduced with 100 parts of iron filings, 10 parts of 80% acetic acid and 1000 parts of water by the Béchamp method. The amino compound is dissolved out of the iron sludge with 2 N caustic soda solution and then precipitated with concentrated acetic acid. After taking up in dilute sodium carbonate, the solution is filtered through animal charcoal and the $N_1$-(4-isopropoxy-benzoyl)-p-amino-benzenesulfonamide again precipitated with acetic acid. The product is filtered under suction, washed with water and recrystallised from dilute alcohol. It melts at 187–188°.

Example 2

30 parts of p-isopropoxy-benzoyl chloride are refluxed for 6 hours with 200 parts of chlorobenzene, 34 parts of p-carbomethoxyamino-benzenesulfonamide and 1 part of copper powder. The chlorobenzene is then removed by steam distillation and the residue is taken up in dilute sodium carbonate solution from which $N_1$-(4-ispropoxy - benzoyl) - p - carbomethoxyamino-benzenesulfonamide is precipitated with concentrated acetic acid. When recrystallised from glacial acetic acid it has a melting point of 246–247°.

The re-precipitated p-carbomethoxyamino-benzenesulfonamide derivative is heated for about an hour with 250 parts of 10% caustic soda solution on the water-bath. After saponification is complete, the whole is poured on to a mixture of ice and hydrochloric acid, causing $N_1$-(4-isopropoxy-benzoyl)-p-amino - benzenesulfonamide to precipitate out. When recrystallised from aqueous alcohol the product melts at 187–188°.

The $N_1$ - acyl - amino-benzenesulfonamide derivative formed can also be isolated in the form of its salts, e. g., the sodium or calcium salt. The sodium salt may be separated from the alcoholic saponification solution by the addition of a saturated solution of common salt. To extract the calcium salt, concentrated acetic acid is added to the alkaline soap solution until it is still just alkaline to phenolphthalein. On the addition of calcium chloride solution the calcium salt then precipitates out.

Example 3

19.8 parts of p-isopropoxy-benzoylchloride are heated with 100 parts of nitrobenzene, 21.4 parts of p-acetylamino-benzenesulfonamide and 1 part of copper powder for a few hours at 130–140°. When no more hydrochloric acid is evolved the nitrobenzene is removed by steam-distillation and the residue dissolved in and reprecipitated from dilute sodium carbonate solution.

The $N_1$-(4-isopropoxy-benzoyl)-p-acetylamino-benzenesulfonamide can be hydrolysed by heating for two hours with 150 parts of 2 N caustic soda solution. The product is precipitated out with dilute hydrochloric acid, dissolved in dilute ammonia, and the solution filtered, with the addition of animal charcoal. The $N_1$-(4-isopropoxy-benzoyl)-p-amino - benzenesulfonamide is then precipitated out with dilute acetic acid. When recrystallised from dilute alcohol the new compound melts at 187–188°.

Hydrolysis can also be carried out with other alkaline media, e. g., with alkaline earth hydroxides. Mineral acids can also be used,

Example 4

198.5 parts of p-isopropoxy-benzoyl chloride are added dropwise to 200 parts of p-nitro-benzenesulfonamide in 500 parts of dry pyridine. The mixture is then warmed for one hour on the water-bath, cooled and poured on to a mixture of ice and concentrated hydrochloric acid. The precipitate is separated by vacuum-filtration, taken up in dilute sodium carbonate solution, filtered with the addition of animal charcoal and then precipitated with concentrated acetic acid.

Instead of pyridine, other acid-binding media may be used, such as dimethylaniline or trimethylamine in a non-reactive solvent, such as dioxan or methylene chloride.

The $N_1$-(4-isopropoxy-benzoyl) - p - nitro-benzenesulfonamide is reduced with 300 parts of iron powder, 50 parts of dilute hydrochloric acid and 2000 parts of 50% alcohol by boiling for 4 hours under reflux. The alcohol is then distilled off, the residue made alkaline to mimosa with dilute caustic soda solution and then filtered. The $N_1$-(4 - isopropoxy - benzoyl) - p - amino - benzenesulfonamide is precipitated from the filtrate in crystalline form by adding concentrated hydrochloric acid. When recrystallised from dilute alcohol, the new compound melts at 187–188°.

Example 5

22.4 parts of the sodium salt of p-nitro-benzenesulfonamide are suspended in 100 parts of nitrobenzene and 19.9 parts of 4-isopropoxy-benzoyl chloride are added. The temperature rises slowly and is maintained for several hours at 50°. Dilute caustic soda solution is then added until the reaction mixture is alkaline to litmus, but neutral to phenolphthalein. This is followed by filtration and extraction of the nitrobenzene with ether. On acidifying the aqueous solution, $N_1$ - (4 - isopropoxy - benzoyl) - p - nitro - benzenesulfonamide is obtained.

On reduction with iron and dilute acetic acid by the Béchamp method, $N_1$ - (4 - isopropoxy-benzoyl) - p - amino - benzenesulfonamide is formed. On recrystallising from aqueous alcohol it has a melting point of 187–188°.

Example 6

17.9 parts of p-isopropoxy benzamide are introduced into 200 parts of absolute xylene and heated to boiling for a few minutes with 4 parts of powdered sodium amide. After cooling, 22.1 parts of p-nitro-benzenesulfonyl chloride in 100 parts of xylene are added and the whole refluxed for several hours. After the xylene has been distilled off, the residue is taken up in dilute sodium carbonate solution and filtered. When the alkaline solution is acidified $N_1$-(4-isopropoxy-benzoyl) - p - nitro - benzenesulfonamide precipitates out and may be purified by recrystallisation from alcohol.

On catalytic reduction with nickel and hydrogen, $N_1$ - (4 - isopropoxy - benzoyl) - p - amino-benzenesulfonamide is obtained which has, after recrystallisation, a melting point of 187–188°.

Example 7

107 parts of p-isopropoxy-benzamidine-hydrochloride are suspended in 500 parts of dry pyridine, 111 parts of p-nitro-benzenesulfonyl chloride are added and the mixture heated for a few hours at 50–60°. After cooling, the solution is poured on ice and sufficient concentrated hydrochloric acid to neutralise the pyridine is added, whereupon the condensation product separates in the form of crystals. The precipitate is washed with water and, without further purification, reduced by the Béchamp process. The N-(4-aminobenzene - sulfonyl)-4'-isopropoxy - benzamidine (M. P. 168°) obtained is heated with 3.5% hydrochloric acid for four hours at 90–100°. After cooling, the solution is made alkaline with dilute sodium carbonate solution, filtered and then acidified with 85% acetic acid. $N_1$-(4-isopropoxybenzoyl) - p - amino - benzenesulfonamide is obtained and on recrystallisation from dilute alcohol, has a melting point of 187–188°.

Instead of starting with p-isopropoxy-benzamidine-hydrochloride, the corresponding iminoethyl-ether-hydrochloride or other suitable p-isopropoxy-benzamidines, alkylated at the nitrogen atom may be reacted with p-nitrobenzenesulfonyl chloride.

*Example 8*

344 parts of $N_1$-(4 - isopropoxy - benzoyl)-p-amino-benzenesulfonamide are suspended in 1000 parts of absolute methyl alcohol and then 60 parts of ethylene-diamine are added dropwise. On warming, the sulfonamide dissolves completely. After stirring, the solution is filtered and concentrated somewhat. The ethylene diamine salt of $N_1$-(4-isopropoxybenzoyl)-p-amino-benzenesulfonamide crystallises out. It is purified by recrystallisation from a mixture of ethyl acetate and alcohol, having then a melting point of 143–144°.

Instead of ethylene diamine there may be used diethylamine, ethylamine or other organic base or basically reacting inorganic compounds.

What I claim is:

The new chemical compound

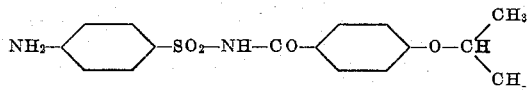

HANS GYSIN.

REFERENCES CITED

The following references are of record in the file of this patent:

UNITED STATES PATENTS

| Number | Name | Date |
|---|---|---|
| 2,383,874 | Martin | Aug. 28, 1945 |

FOREIGN PATENTS

| Number | Country | Date |
|---|---|---|
| 560,661 | Great Britain | Apr. 14, 1944 |